United States Patent
Yamaguchi et al.

(10) Patent No.: US 10,322,577 B2
(45) Date of Patent: Jun. 18, 2019

(54) PRINTING APPARATUS AND PRINTING METHOD

(71) Applicant: CANON FINETECH NISCA INC., Misato-shi (JP)

(72) Inventors: Kenro Yamaguchi, Noda (JP); Masaki Ota, Matsudo (JP)

(73) Assignee: CANON FINETECH NISCA INC., Misato-Shi (JP)

( * ) Notice: Subject to any disclaimer, the term of this patent is extended or adjusted under 35 U.S.C. 154(b) by 0 days.

(21) Appl. No.: 15/690,944

(22) Filed: Aug. 30, 2017

(65) Prior Publication Data
US 2018/0065359 A1    Mar. 8, 2018

(30) Foreign Application Priority Data

Sep. 6, 2016  (JP) .................................. 2016-174015

(51) Int. Cl.
| | | |
|---|---|---|
| B41J 3/01 | (2006.01) | |
| B41J 2/045 | (2006.01) | |
| G06K 15/10 | (2006.01) | |
| B41J 11/00 | (2006.01) | |
| G06K 15/02 | (2006.01) | |

(52) U.S. Cl.
CPC ....... B41J 2/04508 (2013.01); B41J 2/04586 (2013.01); B41J 3/01 (2013.01); B41J 11/008 (2013.01); G06K 15/105 (2013.01); G06K 15/022 (2013.01)

(58) Field of Classification Search
CPC .................. B41J 2/04508; B41J 2/04586; B41J 2/2132; B41J 11/008; B41J 3/01; B41J 29/393; G06K 15/105; G06K 15/022; G06K 15/107
See application file for complete search history.

(56) References Cited

U.S. PATENT DOCUMENTS

| | | | |
|---|---|---|---|
| 8,964,238 B2 | 2/2015 | Miura | |
| 2008/0180509 A1* | 7/2008 | Maki | B41J 2/2128 347/107 |
| 2012/0188564 A1 | 7/2012 | Miura | |
| 2012/0188576 A1* | 7/2012 | Miura | G06K 15/10 358/1.13 |

FOREIGN PATENT DOCUMENTS

| | | |
|---|---|---|
| JP | 10-3509 A | 1/1998 |
| JP | 2004-216615 A | 8/2004 |
| JP | 2005-47168 A | 2/2005 |
| JP | 2006-116975 A | 5/2006 |
| JP | 2006-159700 A | 6/2006 |
| JP | 2006-168052 A | 6/2006 |
| JP | 2012-152957 A | 8/2012 |
| JP | 2017-97586 A | 6/2017 |

\* cited by examiner

*Primary Examiner* — Sharon A. Polk
(74) *Attorney, Agent, or Firm* — Venable LLP

(57) ABSTRACT

A printing apparatus and a printing method which can suppress lowering of reading accuracy of a two-dimensional code caused by shift of a printing position of an image are provided. For that purpose, in printing of the two-dimensional code by a plurality of times of scanning, in a case where a boundary between image regions crosses a square-shaped minimum information element (cell) of the two-dimensional code, a printing position of the two-dimensional code is moved so that the boundary between the image regions comes to an end portion of the cell.

6 Claims, 18 Drawing Sheets

| READABILITY GRADE | CONTENTS OF EACH GRADE | STEEPNESS OF DENSITY CHANGE, BOUNDARY DENSITY CHANGE / LARGEST DENSITY DIFFERENCE |
|---|---|---|
| A | BARCODE WITH HIGHEST QUALITY | ≧ 0.7 |
| B | BARCODE WITH HIGH QUALITY | ≧ 0.6 |
| C | BARCODE READABLE | ≧ 0.5 |
| D | POSSIBILITY OF MISREADING | ≧ 0.4 |
| F | HIGH POSSIBILITY OF MISREADING OR UNREADABLE | < 0.4 |

FIG.18

PRINTING APPARATUS AND PRINTING METHOD

BACKGROUND OF THE INVENTION

Field of the Invention

The present invention relates to a printing apparatus which prints a code on a media such as a printing apparatus which can be used for an inkjet type printing apparatus which performs printing by ejecting ink, and to a printing method.

Description of the Related Art

A printing apparatus which performs printing by ejecting ink from a moving print head is used in printing in a wide variety of fields. Moreover, in recent years, printing of a two-dimensional code on a media has been performed by using such a printing apparatus.

In printing of a two-dimensional code, it should have such a printing quality that a reader accurately and rapidly recognizes and does not misread it. Specifically, it is necessary that (1) density contrast between a white part (non-printed part) and a black part (printed part) is high; and (2) a density change at a boundary between the white part and the black part is sharp. Moreover, it is necessary that (3) arrangement of each component, element, and cell is accurate; and (4) a position detection pattern of the two-dimensional code is printed without deficiency.

In printing in the inkjet printing apparatus which performs printing by ejecting ink while moving the print head, the ejected ink is ejected after being separated to a main droplet and a sub droplet. Thus, in a case where the sub droplet adheres much to the white part in printing of the two-dimensional code, the reader recognizes that a region of the white part is small, and reading accuracy lowers in some cases. Moreover, in the inkjet printing apparatus, one two-dimensional code is printed by a plurality of times of scanning in some cases. In this case, a shift occurs at a boundary in printing for each scanning in some cases, and reading accuracy lowers in some cases due to variation in a movement amount when the print head moves or variation in a conveyance amount of the media.

The lowering of reading accuracy caused by the sub droplet generated at ejection of the ink can be suppressed by the method of Japanese Patent Laid-Open No. 2005-47168, but the lowering of the code information reading accuracy caused by the shift of printing positions of an image cannot be suppressed, which remains to be a problem.

SUMMARY OF THE INVENTION

A printing apparatus of the present invention includes a printing unit performing printing on a printing medium by a plurality of times of scanning, a two-dimensional code position determining unit determining whether a boundary of the plurality of times of scanning of the printing unit crosses a constituent element of a two-dimensional code in printing of the two-dimensional code by the printing unit, and a control unit controlling so that the boundary of the scanning of the printing unit does not cross the constituent element on the basis of a determination result of the two-dimensional code position determining unit.

Further features of the present invention will become apparent from the following description of exemplary embodiments with reference to the attached drawings.

BRIEF DESCRIPTION OF THE DRAWINGS

FIG. 18 is a view illustrating numeral values of density changes of a white part and a black part corresponding to grades.

DESCRIPTION OF THE EMBODIMENTS (First Embodiment)

Figure 1:
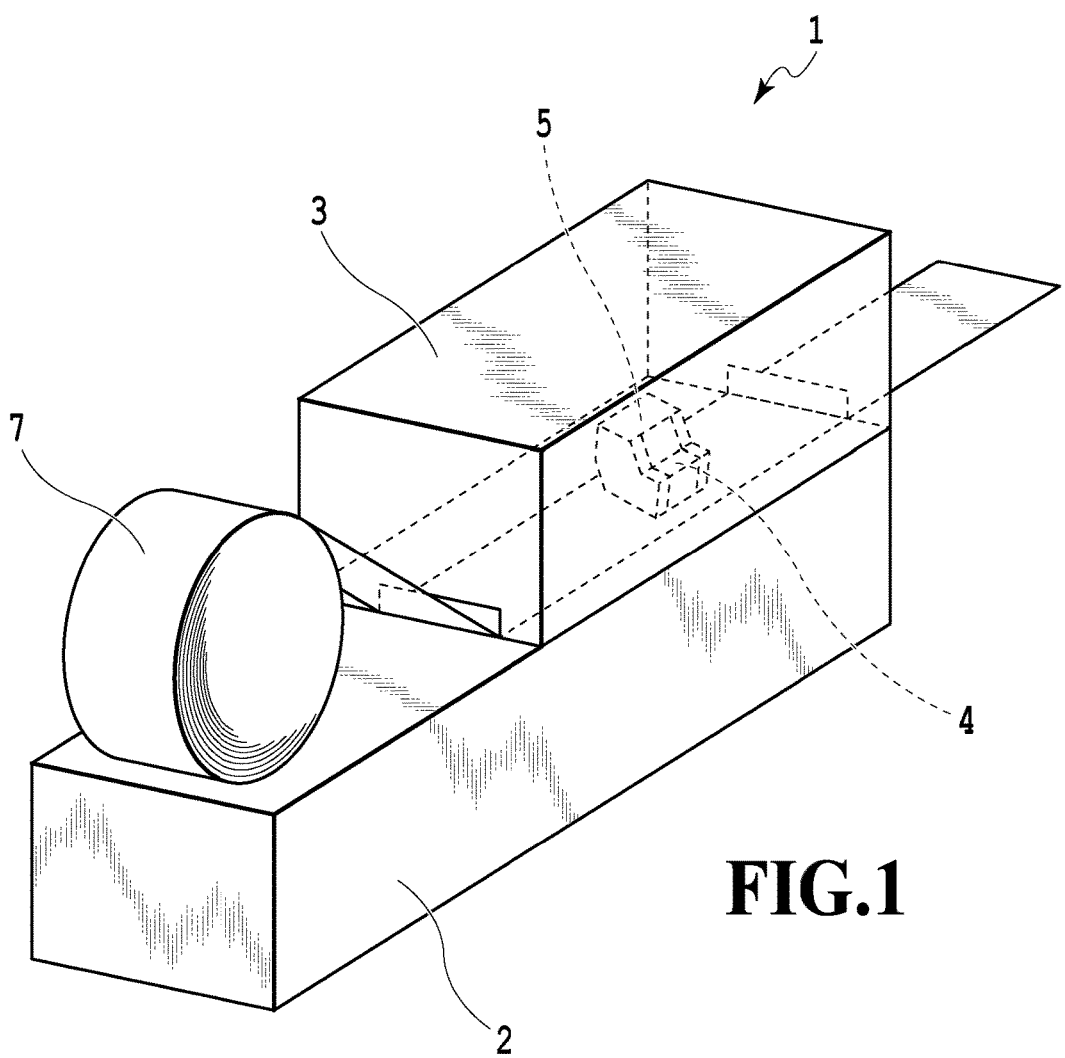
FIG. 1 is a schematic view of a printing apparatus.

A first embodiment of the present invention will be described below by referring to the drawings. FIG. 1 is a schematic view of an inkjet printing apparatus (hereinafter, also referred to simply as a printing apparatus) 1 to which this embodiment can be applied. The printing apparatus 1 is a printing apparatus which prints an image including a two-dimensional code by ejecting an ink droplet onto a label. Major constitutions of the printing apparatus 1 are a conveyance unit 2 which conveys a label (printing medium) 7 wound in a roll state while withdrawing it and an engine unit 3 which performs printing on the conveyed label. The engine unit 3 includes a print head 4 which ejects ink and a carriage 5 which moves while holding the print head 4.

Figure 2:
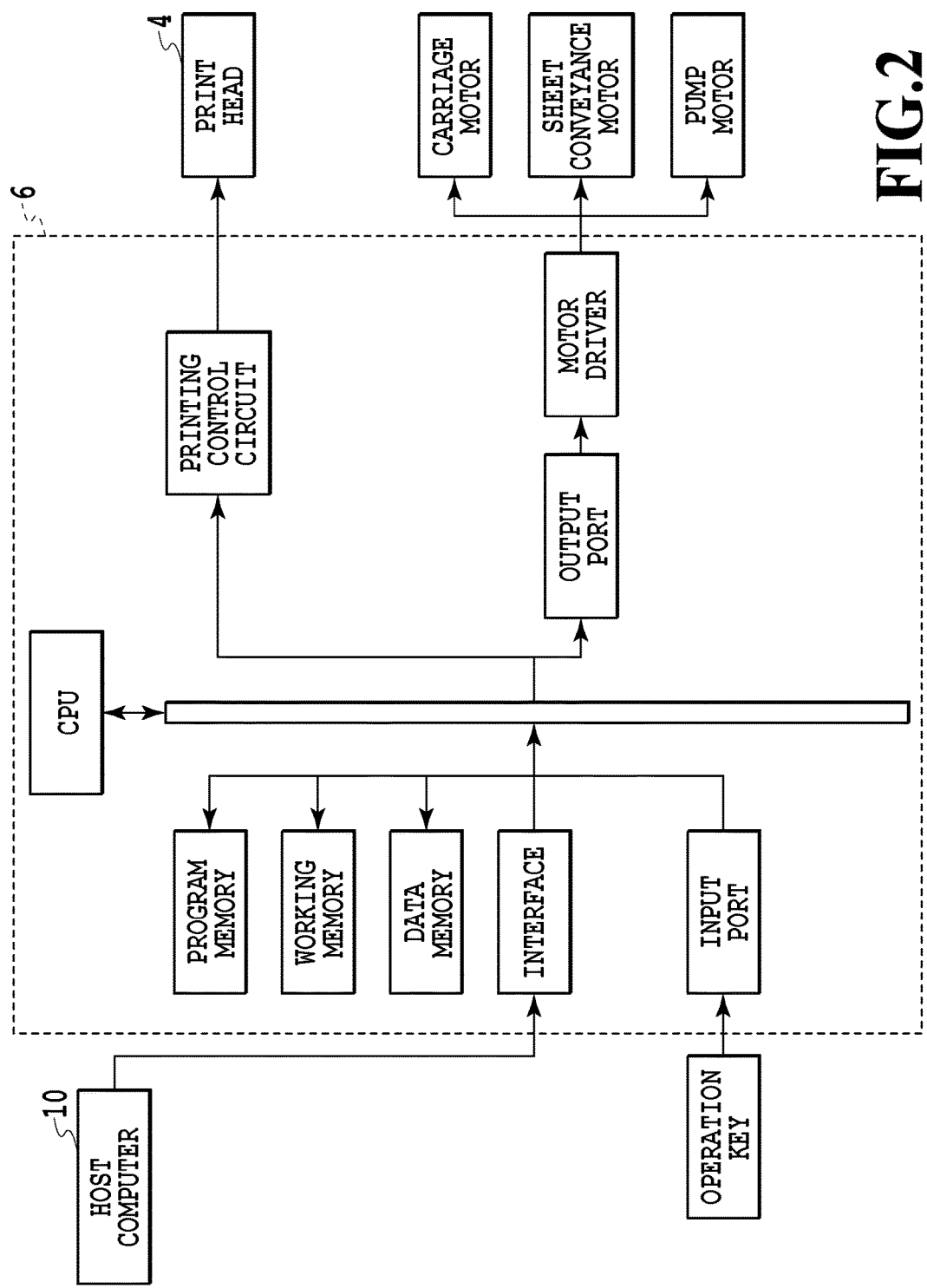
FIG. 2 is a block diagram illustrating a control system of the printing apparatus.

FIG. 2 is a block diagram illustrating a control system of the printing apparatus 1. A control unit 6 is mounted in the engine unit 3, and an operation of the printing apparatus 1 is controlled by the control unit 6. Moreover, a motor driver is connected to a carriage motor, a conveyance motor, and a pump motor and operates each of the motors upon receipt of a driving signal. Image information is transmitted to the control unit 6 of a printer body from a host computer (external PC) through an interface and is processed by a CPU in the control unit 6. Then, the control unit 6 performs image processing by using a program and a memory, performs ink ejection control of a print head and executes printing.

Figure 3:
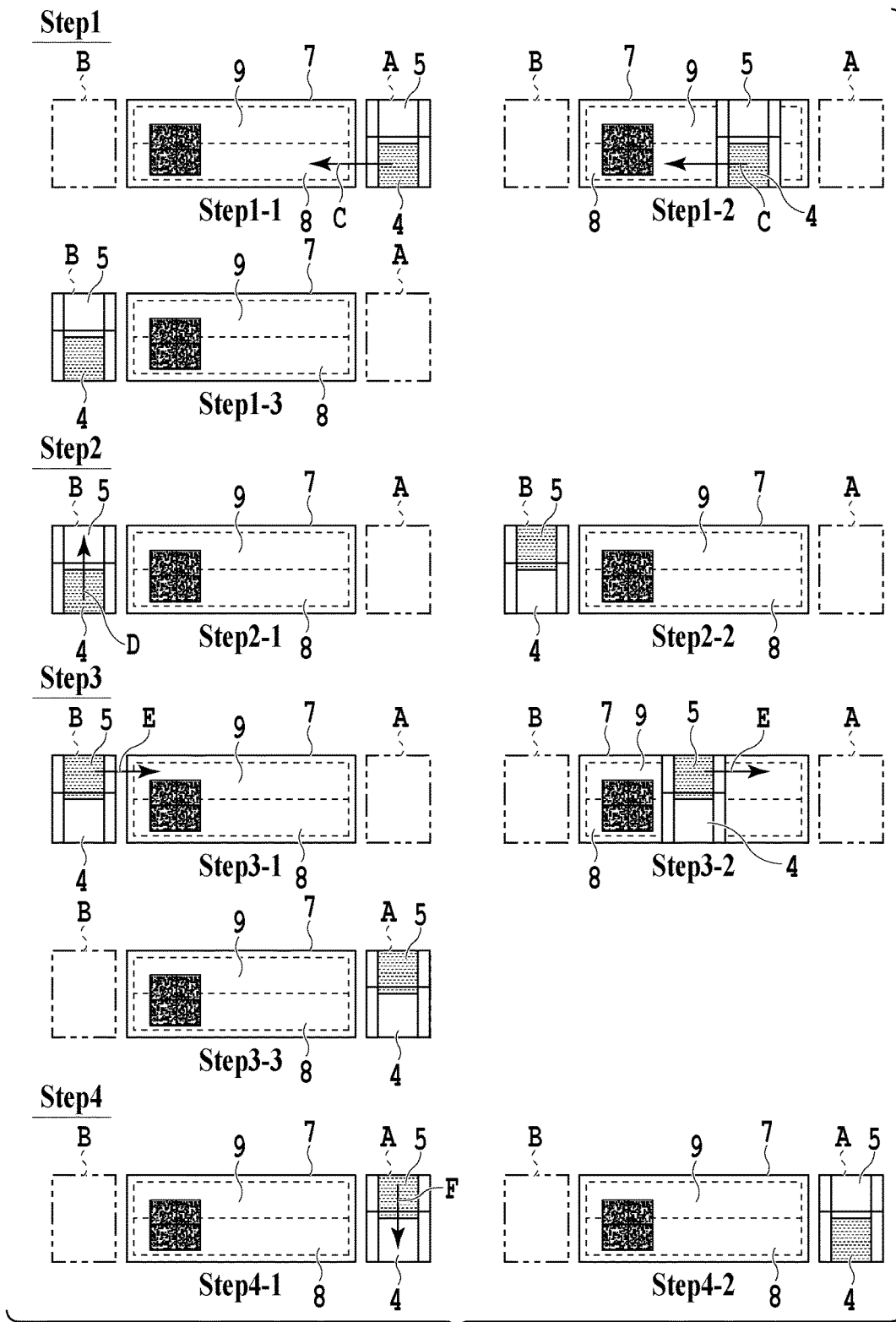
FIG. 3 is a view illustrating a movement path of a print head in printing.

FIG. 3 is a view illustrating a movement path of the print head 4 in printing. Hereinafter, a printing operation in the printing apparatus 1 will be described. In this embodiment, a two-dimensional code is printed on the label 7. The CPU, after the label is conveyed by the conveyance unit 2 to the engine unit 3, stops conveyance of the label 7. After that, the CPU moves the print head 4 on the basis of image information which the control unit 6 received from a host computer 10. The print head 4 is mounted on the carriage 5, and the carriage 5 is conveyed by a conveyance belt driven by the carriage motor along a guide rail, not shown. Moreover, the print head 4 is constituted movably also in a direction orthogonal to a conveyance direction of the carriage 5 in the carriage 5. In this embodiment, an image is completed on the label by two times of scanning of the print head 4.

At Step 1, a lower half of the two-dimensional code is printed. The print head 4 located at an initial position A at Step 1-1 starts movement in an arrow C direction as in Step 1-2, performs printing of the two-dimensional code (lower half) by ejecting ink at a predetermined position in an image region 8, and stops at a position B at Step 1-3. After that, the path is changed at Step 2. The print head 4 at the position B at Step 2-1 moves in an arrow D direction and moves to a position where printing can be performed on an image region 9 as in Step 2-2. Then, at Step 3, printing of an upper half of the two-dimensional code is performed. At Step 3-1, the print head 4 located at the position B starts movement in an arrow E direction as in Step 3-2 at start of the movement, performs printing of the two-dimensional code (upper half) by ejecting ink at a predetermined position in the image region 9, and stops at the initial position A at Step 3-3. After that, the path is changed again at Step 4. The print head 4 at the initial position A at Step 4-1 moves in an arrow F direction and moves to a position where printing can be performed on the image region 8 as in Step 4-2. In this way, the CPU completes one image (two-dimensional code) by scanning of the print head 4 while dividing it into scanning for image formation of the upper half and scanning for image formation of the lower half.

Printing divided into the upper half and the lower half may cause a shift at the image boundary.

Figure 4A:
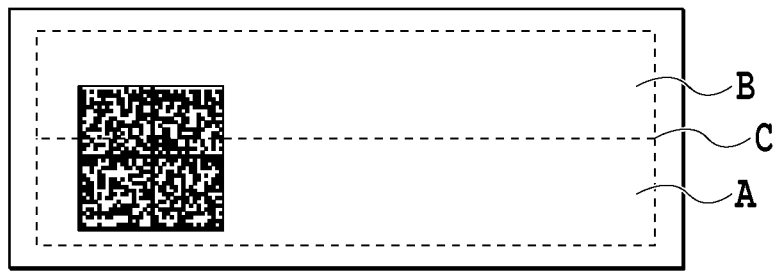
FIG. 4A is a view illustrating an example in a case where there is no shift between images including a two-dimensional code.
Figure 4B:
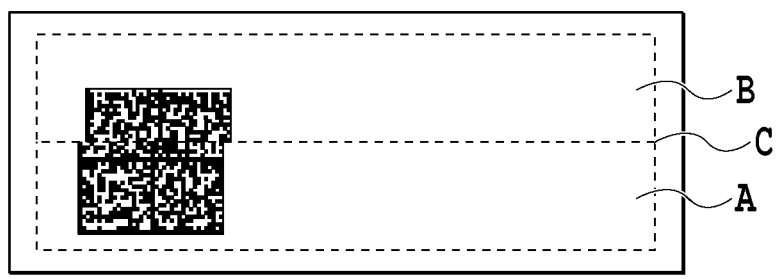
FIG. 4B is a view illustrating an example in a case where there is a shift between the images including the two-dimensional code.
Figure 4C:
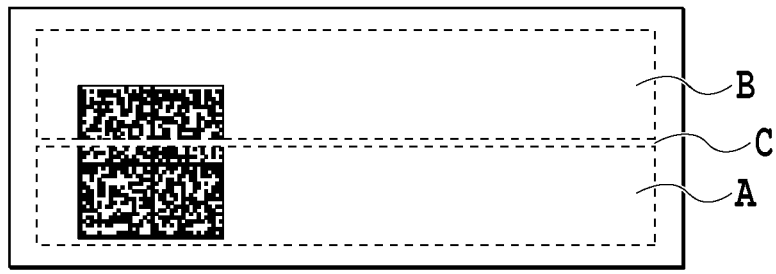
FIG. 4C is a view illustrating an example in the case where there is a shift between the images including the two-dimensional code.
Figure 4D:
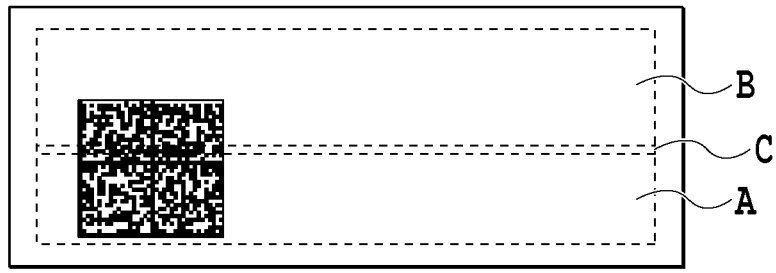
FIG. 4D is a view illustrating an example in the case where there is a shift between the images including the two-dimensional code.

FIGS. 4A to 4D are views illustrating examples where there is no shift between images including a two-dimensional code and a case where there is a shift. FIG. 4A is an image in a case where no shift occurs. In a case where a shift occurs due to an error in conveyance of the print head 4 during printing, images shift at a boundary C. FIG. 4B is an image of shift in a lateral direction due to variation in a conveyance amount of the print head 4. FIG. 4C is an image in a case where a shift occurs when the print head 4 moves in a direction orthogonal to a conveyance direction of the conveyance belt, and image regions on an upper side and a lower side shift in directions separated from each other in a vertical direction. Further, FIG. 4D is an image in which the image on the upper side and the image on the lower side are overlapped with each other in the vertical direction in a case of shift in a direction opposite to that in FIG. 4C.

Figures 5A, 5B:
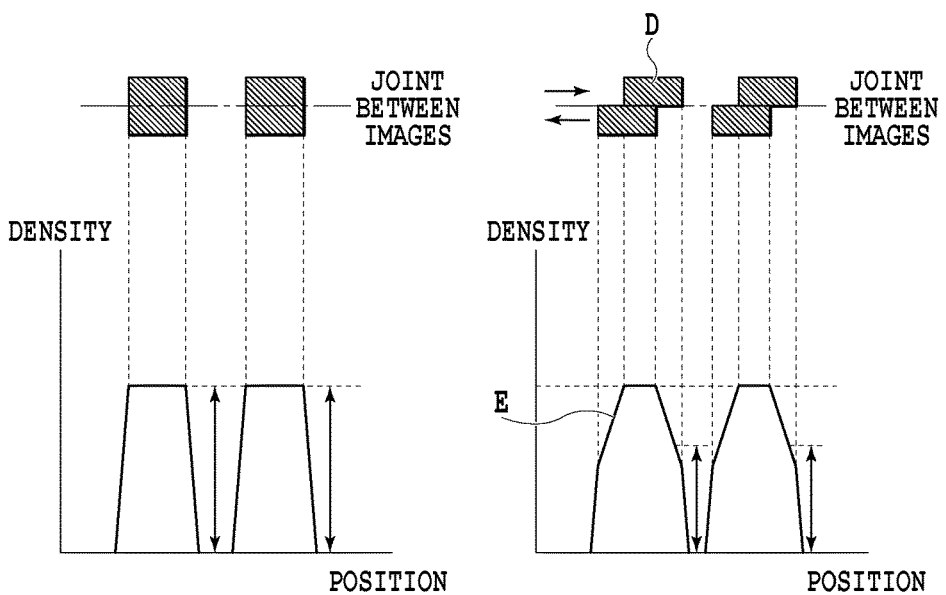
FIG. 5A is a view illustrating cells of the two-dimensional code at a boundary.
FIG. 5B is a view illustrating the cells of the two-dimensional code at the boundary.

FIGS. 5A and 5B are views illustrating a square-shaped minimum information element (hereinafter, referred to also as a cell) of the two-dimensional code at the boundary. FIG. 5A illustrates a cell without shift, while FIG. 5B illustrates a cell shifted in the lateral direction as in FIG. 4B. Corresponding graphs illustrate density distribution detected by a reader in correspondence to arrangement of the cells. Here, a case where the boundary between image regions crosses a center of the cell in the two-dimensional code is illustrated. In a case where no shift occurs, a shape of the cell is held as in FIG. 5A, but in a case where a lateral shift occurs as in FIG. 5B, it looks like a step generated in the cell. In a case of this state, the step portion is recognized by the reader as an intermediate density, and a density change at a boundary part becomes gentle. As a result, accuracy in two-dimensional code reading can lower easily.

Figure 6A:
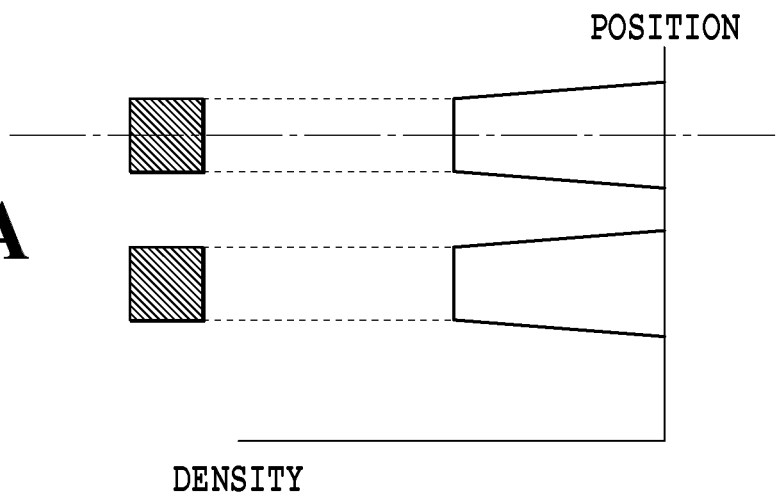
FIG. 6A is a view illustrating a case where there is no shift in a cell at the boundary.
Figure 6B:
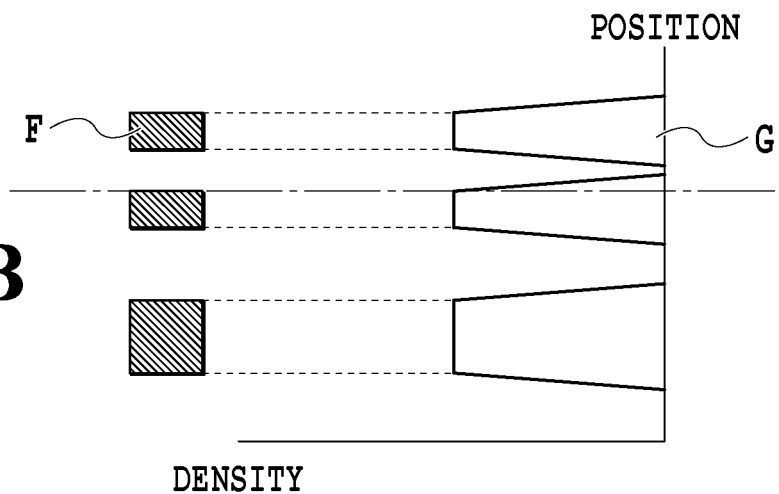
FIG. 6B is a view illustrating a case where there is a shift in the cell at the boundary.

FIGS. 6A and 6B are views illustrating a case where the cell at the boundary does not shift and a case where the cell shifts. FIG. 6A illustrates the cell without shift, while FIG. 6B illustrates the cell shifted and separated in the vertical direction. Corresponding graphs illustrate density distribution detected by the reader in correspondence to arrangement of the cells. In the case where no shift occurs, the shape of the cell is held as in FIG. 6A, but in the case where a vertical shift occurs as in FIG. 6B, the cell is divided as in FIG. 6B. In the case where the cell is divided as above, the reader recognizes that a cell width is small and that there is no cell, and the reader may not be able to read the cell.

In this way the image shift in the cell impairs accuracy of reading greatly.

Figure 7A:
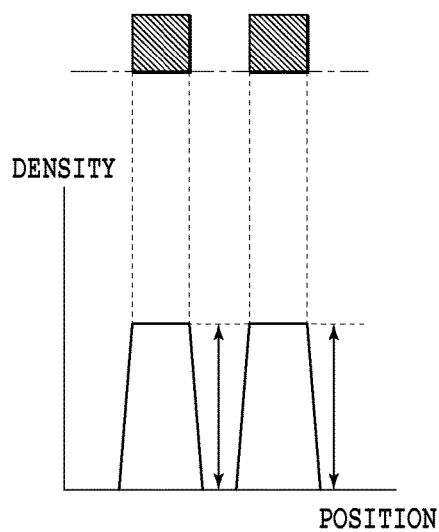
FIG. 7A is a view illustrating a case where there is a boundary between images at end portions of cells.
Figure 7B:
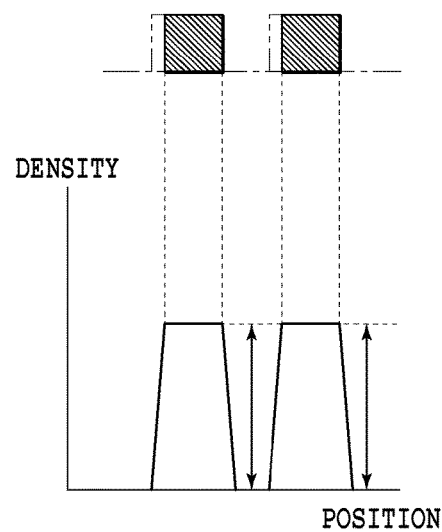
FIG. 7B is a view illustrating a case where there is a boundary between images at the end portions of the cells.
Figure 8A:
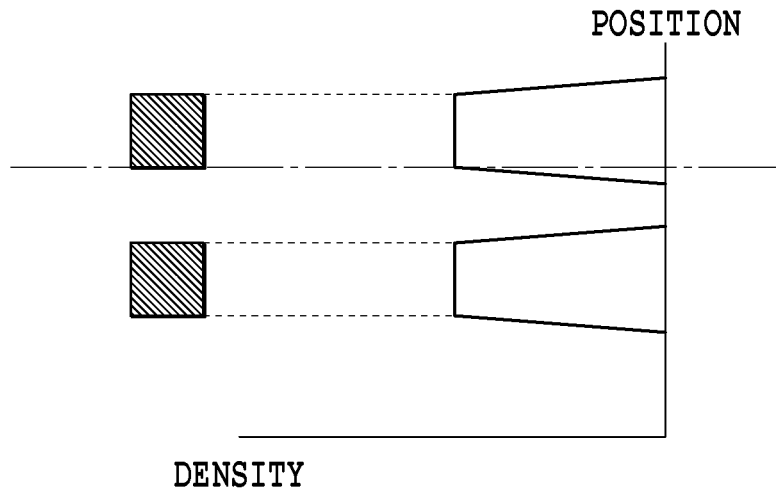
FIG. 8A is a view illustrating a case where there is a boundary between images at an end portion of a cell.
Figure 8B:
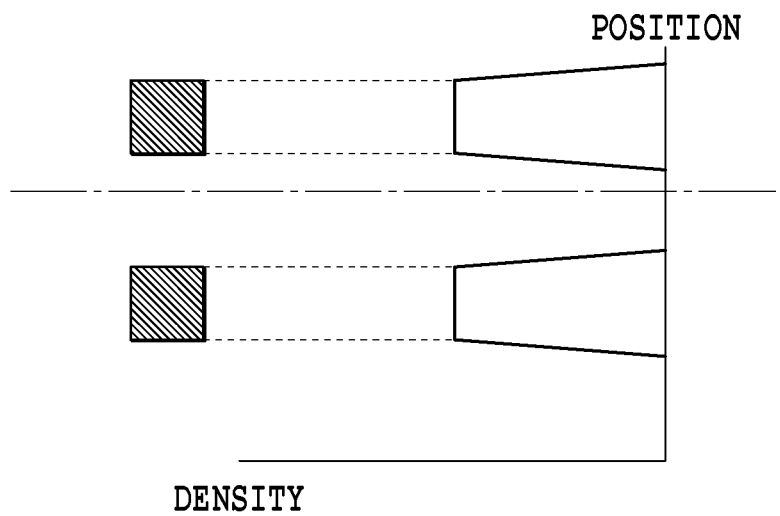
FIG. 8B is a view illustrating a case where there is a boundary between images at an end portion of the cell.

FIGS. 7A and 7B illustrate a case where there is a boundary between an image of an upper half and an image of a lower half at an end portion of the cell, and FIG. 7A illustrates a case without shift, while FIG. 7B illustrates a case where a lateral shift occurs with respect to an actual position indicated by a dot line. Moreover, FIGS. 8A and 8B also illustrate a case where there is a boundary between the image of the upper half and the image of the lower half at the end portion of the cell, and FIG. 8A illustrates a case without shift, while FIG. 8B illustrates a case where a shift occurs in the vertical direction.

In a relationship in which the end portion of the cell matches the boundary between the image of the upper half and the image of the lower half as illustrated in FIG. 7B, even in a case where the lateral shift occurs, the reader recognizes that the density change at a boundary between the cells is steep, and reads the two-dimensional code accurately. Moreover, even with respect to the shift in the vertical direction (separating direction), in the relationship in which the end portion of the cell matches the boundary between the image of the upper half and the image of the lower half as illustrated in FIG. 8B, the cell is not divided and the reader can read the cell accurately.

Thus, in this embodiment, in a case where the boundary between the image of the upper half and the image of the lower half crosses the cell, image correction is performed so that the boundary becomes the end portion of the cell.

Figure 9:
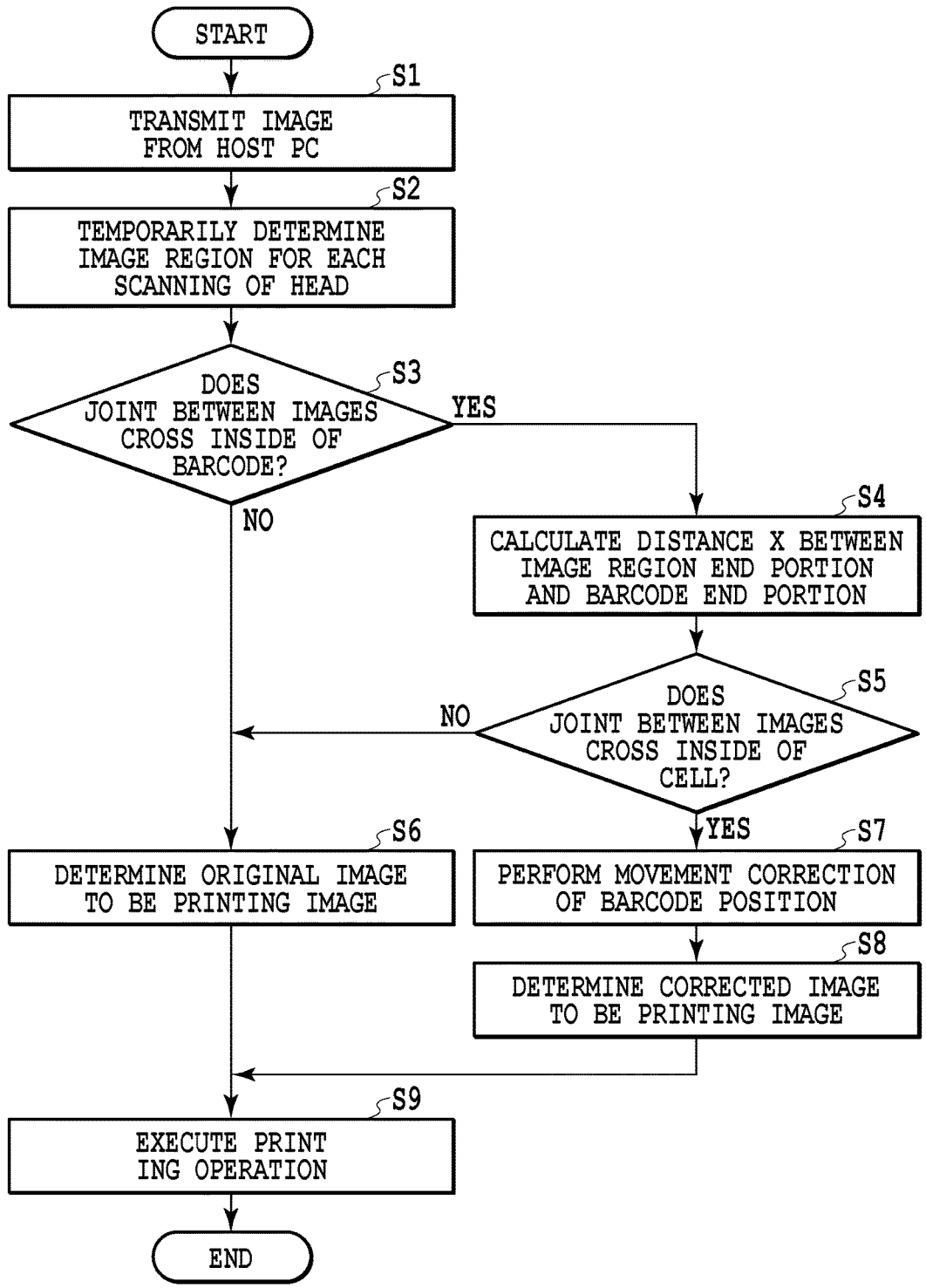
FIG. 9 is a flowchart illustrating control in printing in the printing apparatus.
Figure 10:
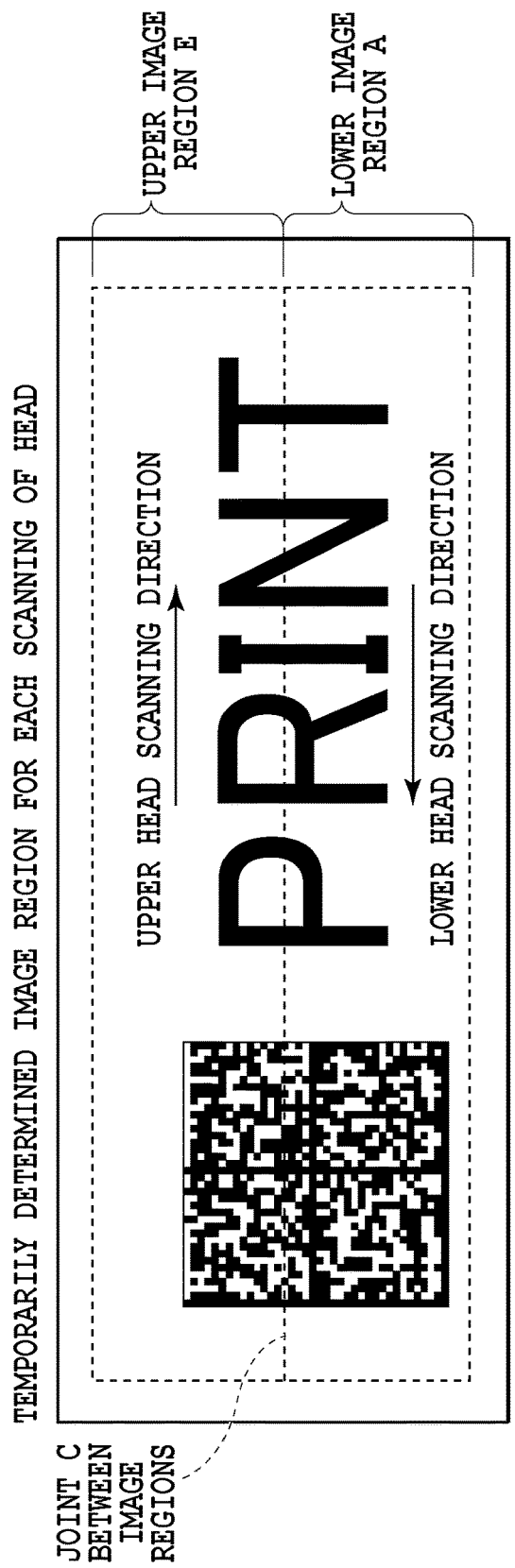
FIG. 10 is a view illustrating printing regions and a boundary between images in a print image for each scanning.
Figure 11:
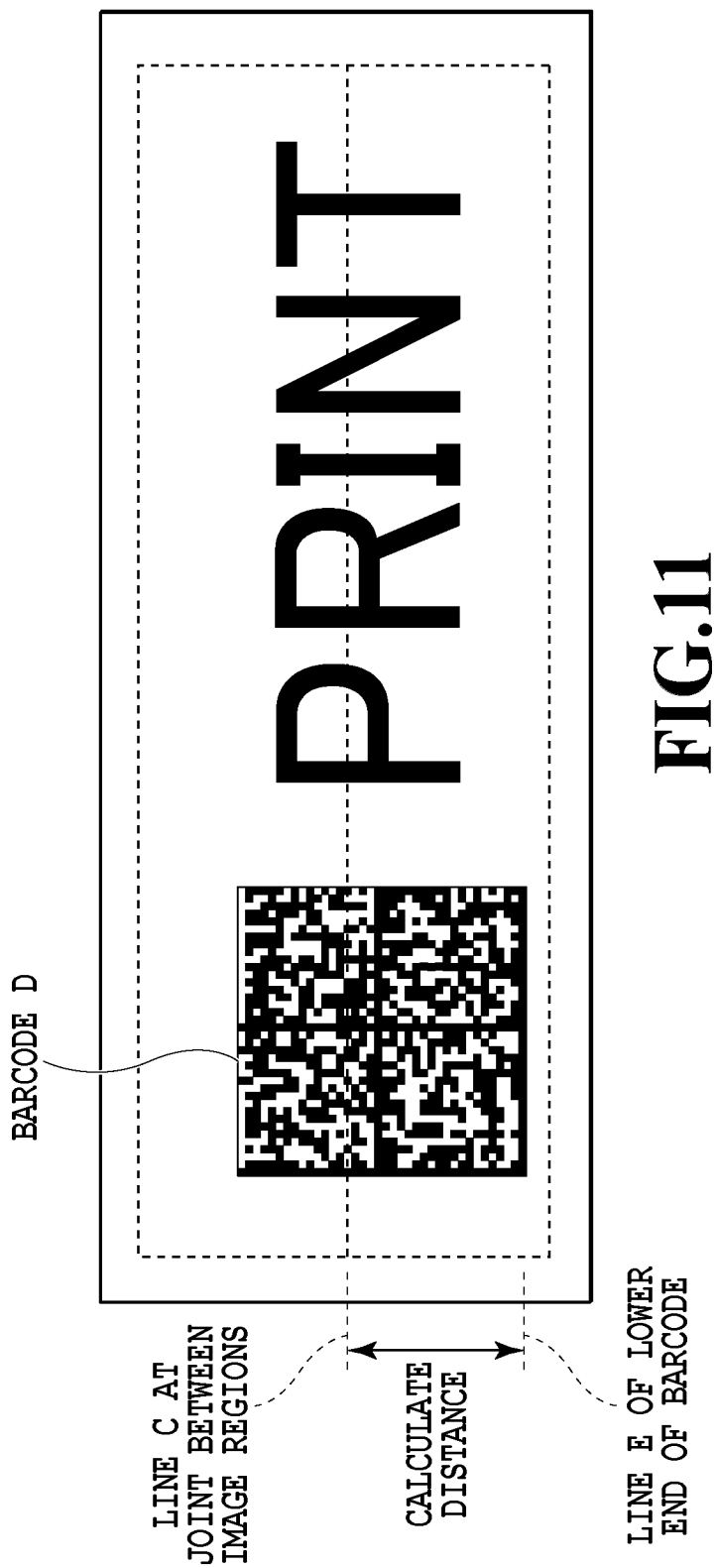
FIG. 11 is a view illustrating a state of detection of a position of a boundary in a two-dimensional code.

FIG. 9 is a flowchart illustrating control in printing in the printing apparatus 1 of this embodiment, FIG. 10 is a view illustrating printing regions and the boundary between images in a print image for each scanning, and FIG. 11 is a view illustrating a state of detection of a position of the boundary in the two-dimensional code. Hereinafter, control in printing will be described by using the flowchart in FIG. 9 and FIGS. 10 and 11. In a case where printing control is started, at Step S1, the CPU causes a host PC to transmit image information to the control unit 6. At this time, a position and a type of a two-dimensional code in the image information and size information of the cell are transmitted to the control unit 6.

After that, at Step S2, CPU determines a region A (see FIG. 10) where printing is performed by first scanning for printing a lower side of the image and an image region B (see FIG. 10) where printing is performed by second scanning for printing an upper side of the image temporarily. Then, CPU determines at Step S3 on whether a boundary C between the image region B on the upper side and the image region A on the lower side crosses the two-dimensional code. In a case where an upper end portion of the two-dimensional code is present in the upper image region and a lower end portion is present in the lower image region, CPU determines that the boundary C crosses the two-dimensional code. In the other cases, CPU determines that the boundary between the image regions does not cross the two-dimensional code. In a case where CPU determines at Step S3 that the boundary does not cross the two-dimensional code, the process proceeds to Step S6, and CPU determines not to perform correction processing of the image, and CPU uses the original image as a print image as it is. Alternatively, in a case where CPU determines that the boundary crosses the two-dimensional code, the process proceeds to Step S4.

At Step S4, as illustrated in FIG. 11, CPU detects a position relationship between the image region A where printing is performed by the first scanning, and a two-dimensional code D. CPU calculates a distance (number of pixels) between a coordinate of a pixel in a direction orthogonal to the scanning direction at a line C of the boundary between the images which is an upper end portion of the image region A in the first scanning and a coordinate of a pixel in the direction orthogonal to the scanning direction at a line E on a lower end of the two-dimensional code. After that, at Step S5, CPU determines whether the boundary C between the image region A in the first scanning and the image region B in the second scanning crosses the cell in the two-dimensional code. Here, description will be made by using FIGS. 12A and 12B.

Figure 12A:
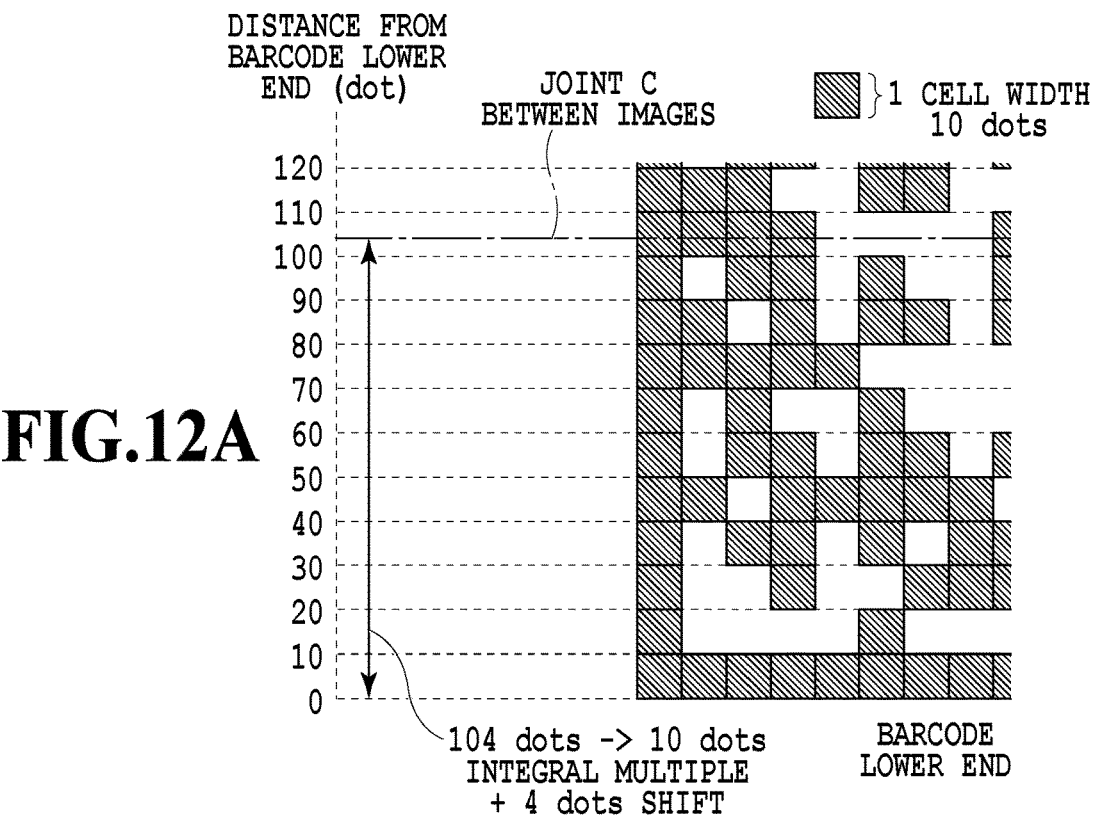
FIG. 12A is a view illustrating a method of determining whether a boundary between images crosses a cell.
Figure 12B:
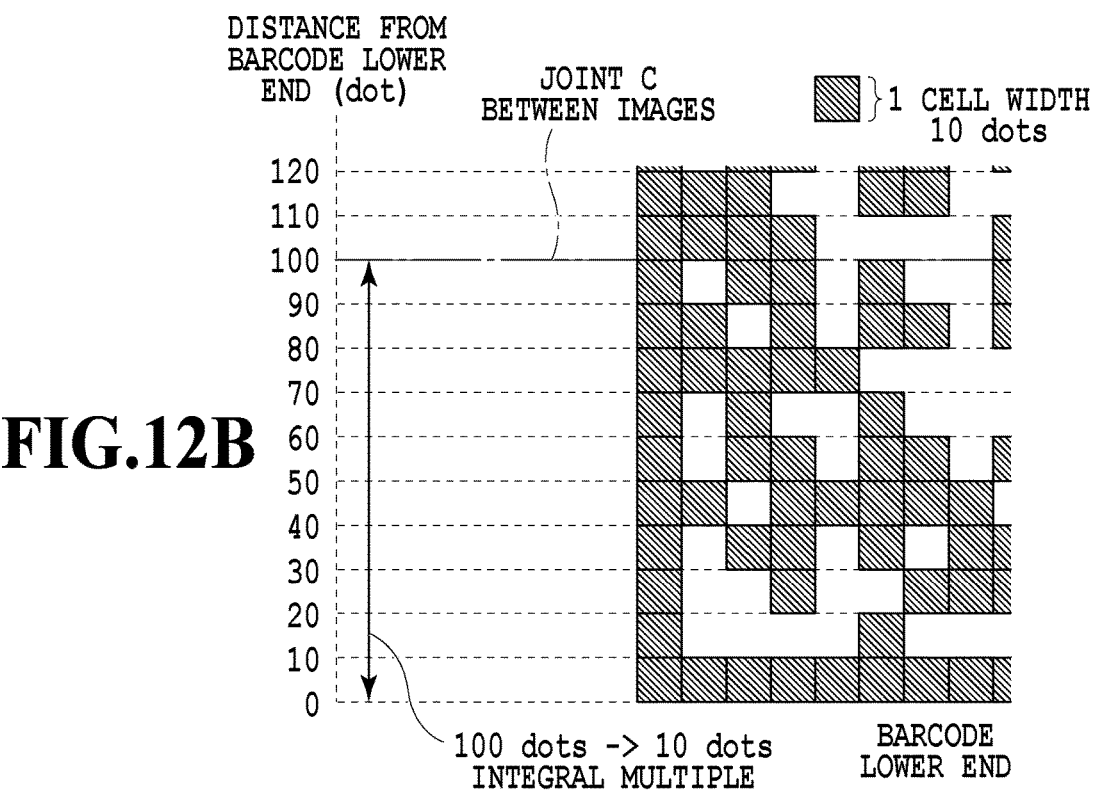
FIG. 12B is a view illustrating a method of determining whether the boundary between images crosses the cell.

FIGS. 12A and 12B are views illustrating a method of determining whether the boundary between images crosses the cell. In this determination, CPU checks whether a distance between the boundary C calculated at Step S4 and the lower end line E of the two-dimensional code is integral multiple of a width of the cell in the direction orthogonal to the scanning direction. In a case where result of check is integral multiple, the boundary C does not cross the cell in the two-dimensional code as in FIG. 12B, while in a case where result of check is not integral multiple, the boundary C crosses the cell as in FIG. 12A. In a case where the boundary C does not cross the cell, the process proceeds to Step S6, and CPU determines not to perform correction processing of the image, and uses the original image as a print image. In a case where the boundary C crosses the cell, the process proceeds to Step S7, and CPU performs correction processing of the image.

Figure 13A:
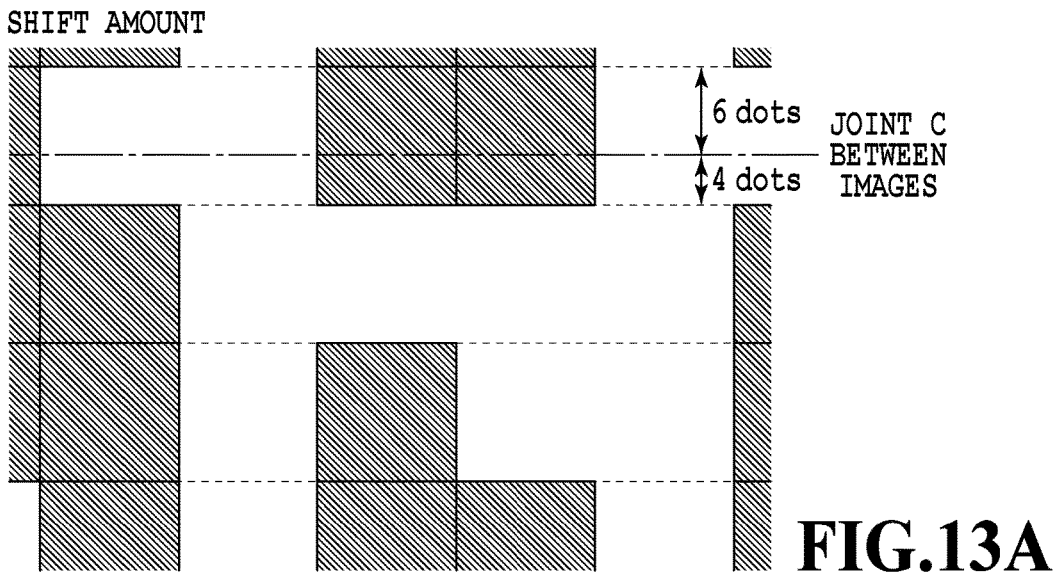
FIG. 13A is a view illustrating a method of image correction.
Figure 13B:
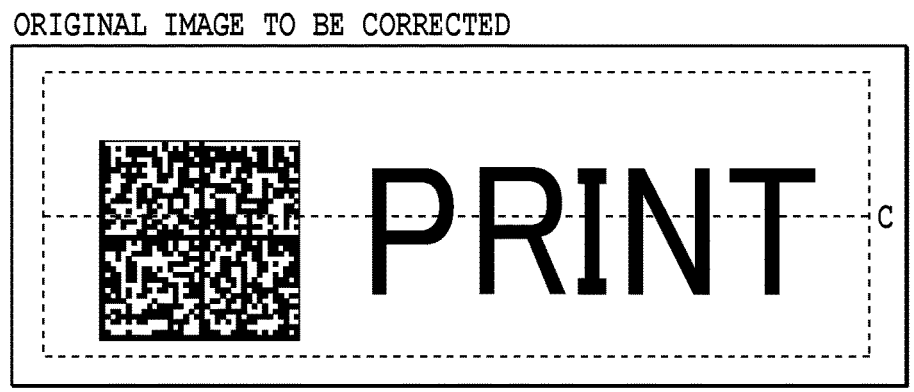
FIG. 13B is a view illustrating the method of image correction.
Figure 13C:
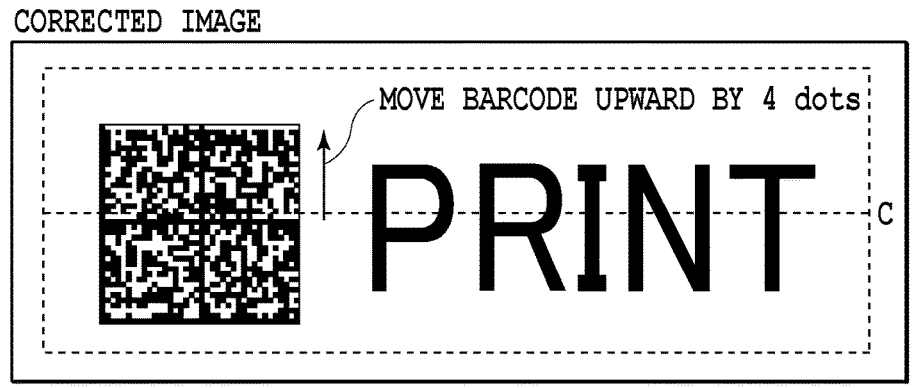
FIG. 13C is a view illustrating the method of image correction.

FIGS. 13A to 13C are views illustrating a method of image correction in this embodiment. At Step S7, CPU uses the number of pixels of a difference between the end portion of the image region calculated at Step S4 and a numeral value of the closest integral multiple to the cell width as a correction value, and CPU moves the position of the two-dimensional code in a direction perpendicular to the scanning direction for the correction value portion. By means of movement with correction as described above, the corrected position becomes a position obtained by moving the two-dimensional code for the shortest movement distance. In the case of FIG. 13A, the line of the end portion of the image region matches the line of the end portion of the cell by moving the two-dimensional code to the upper side in the figure for 4 dots. CPU determines the image corrected as above to be a print image. FIG. 13B is an image before the correction, while FIG. 13C illustrates an image after the correction. By executing control as above, the end portion of the image region does not cross the cell any more, and even in a case of shift in printing, image correction suppresses impairment of reading accuracy of the two-dimensional code.

Note that, a reference position for detecting the position of the two-dimensional code at Step S4 is preferably present in a printing portion separate from the two-dimensional code, and a position detection pattern specific to each type of the two-dimensional code is preferably set to the reference position. Moreover, a method of image correction processing at Step S7 may be a method of moving the entire image.

Figure 17A:
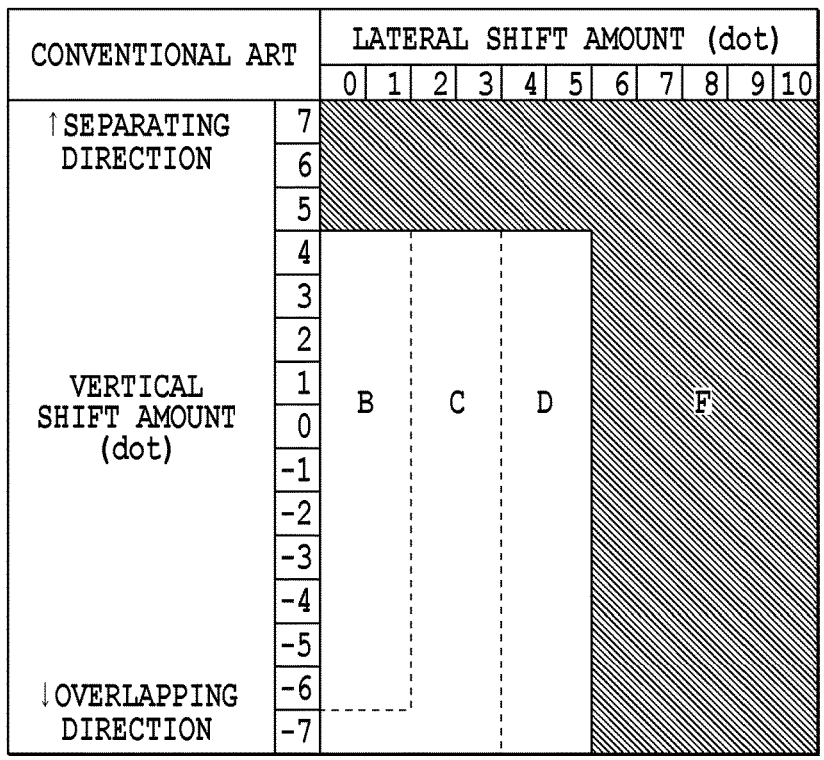
FIG. 17A is a view illustrating a conventional effect.
Figure 17B:
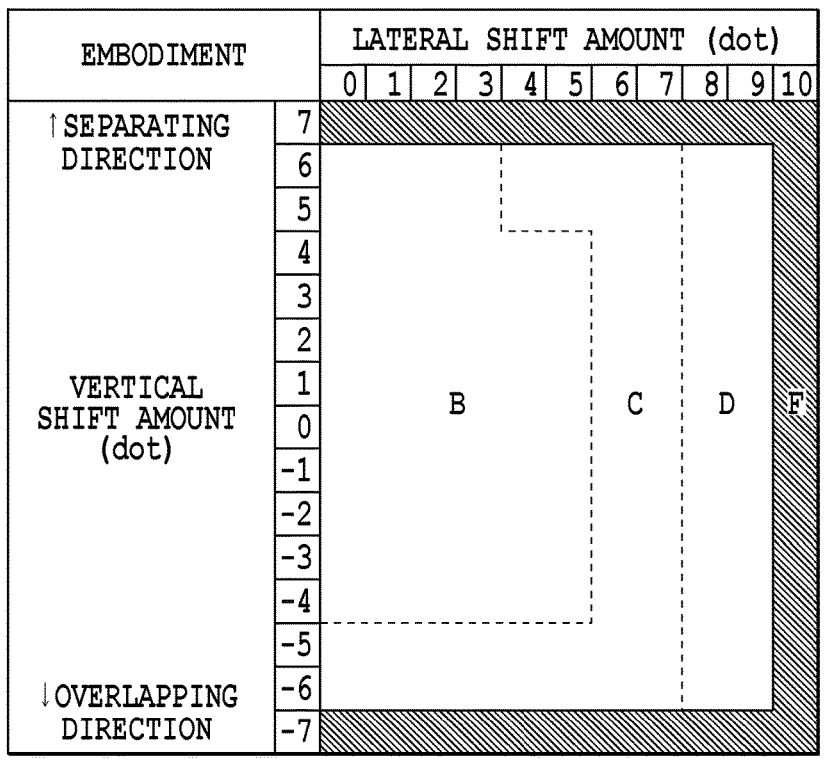
FIG. 17B is a view illustrating an effect in this embodiment.

FIGS. 17A and 17B are views illustrating effects in this embodiment in comparison with a conventional case, in which FIG. 17A is a conventional art and FIG. 17B is a view illustrating the effects in this embodiment. Moreover, FIG. 18 is a view illustrating a numeral value of steepness of the density changes of the white part and the black part corresponding to a grade of readability. In FIGS. 17A and 17B, a lateral axis of a graph indicates a shift amount of lateral shift, while a positive direction of a vertical axis indicates a vertical shift amount in a separating direction and a negative direction of the vertical axis indicates the vertical shift amount in an overlapping direction in a form in which the boundary of images crosses the inside of the two-dimensional code. Reading accuracy is described for each shift amount.

Here, a change of readability in the lateral shift direction depends on steepness of the density change at the boundary between the black part and the white part. The steepness of the density changes of the white part and the black part is defined as follows. Assuming that the density change at the boundary between the black part and the white part is EC, a difference between the highest density of the black part and the lowest density of the white part is SC, and the steepness is M, it is defined to be M=EC/SC.

Regarding the grade of the readability of reader, grades up to C are levels which meet practical use, and a grade D has a high possibility of misreading. A grade F is unreadable.

Moreover, an influence in the vertical shift direction of this embodiment is that reader cannot recognize the cell any more, and when separating in a separating direction, reader recognizes the cell width to be insufficient as described above and does not recognize to be a two-dimensional code any longer.

In the conventional art as in FIG. 17A, reading accuracy of reader is largely lowered by the lateral shift, but by using control of the present invention as in FIG. 17B, it is known that the reading accuracy of reader can be maintained more than the conventional control even in the case of the lateral shift. Moreover, in the vertical shift, too, it is known that the reading accuracy of reader can be maintained more in the control of the present invention in a case of shift in the separating direction.

Note that, in this embodiment, the inkjet printing apparatus which performs printing by ejecting ink is described as an example, but this is not limiting, and it only needs to be a printing apparatus which prints an image including a two-dimensional code by a plurality of times of scanning.

Moreover, in this example, the position of the two-dimensional code is moved on image data so that the boundary between the image regions becomes the end portion of the cell, but the boundary between the image regions may be the end portion of the cell by moving the position of the printing medium without moving the two-dimensional code on the image data.

As described above, in printing of the two-dimensional code by a plurality of times of scanning, in a case where the boundary between image regions crosses the square-shaped minimum information element (cell) of the two-dimensional code, the printing position of the two-dimensional code is moved so that the boundary between the image regions comes to the end portion of the cell. As a result, the printing apparatus and the printing method which can suppress lowering of reading accuracy of the two-dimensional code caused by shift of images could be realized.

(Second Embodiment)

Hereinafter, a second embodiment of the present invention will be described by referring to the drawings. Note that, since basic constitution of this embodiment is similar to that of the first embodiment, only featured constitutions will be described below. In this embodiment, handling of a case where there is another image element at a movement destination of the two-dimensional code will be described.

Figure 14:
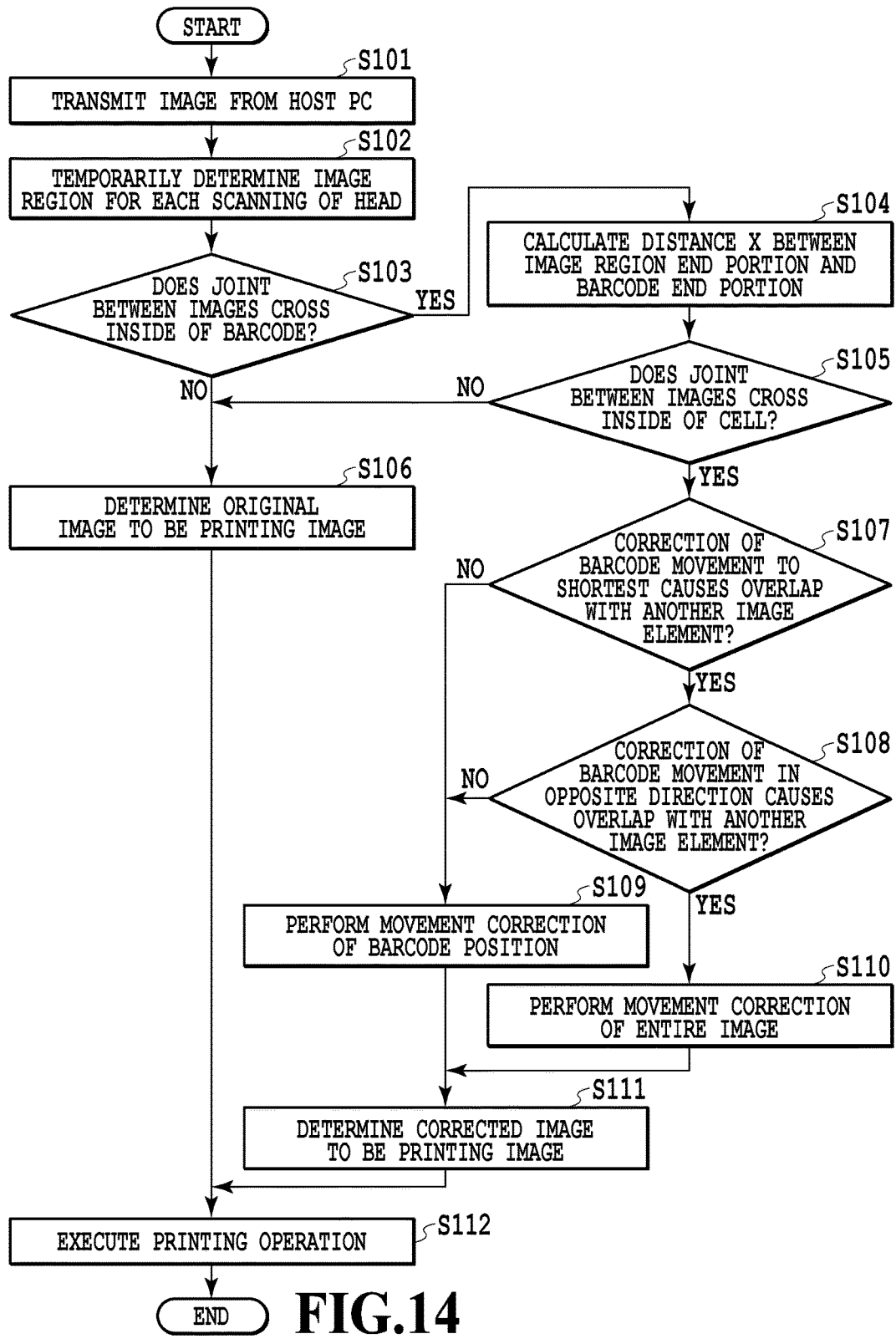
FIG. 14 is a flowchart illustrating printing control.
Figure 15A:
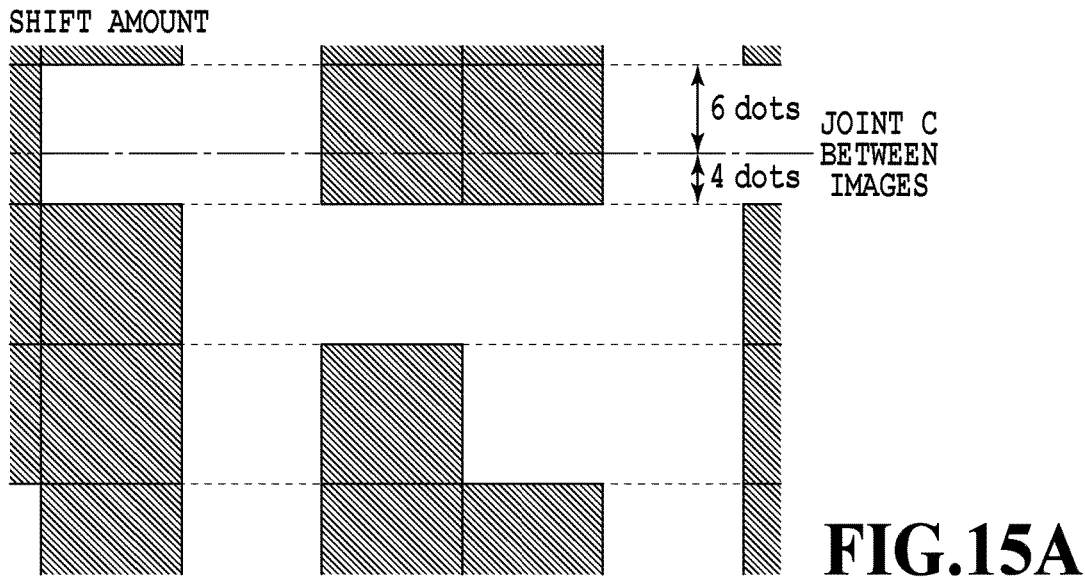
FIG. 15A is a view illustrating a method of image correction.
Figure 15B:
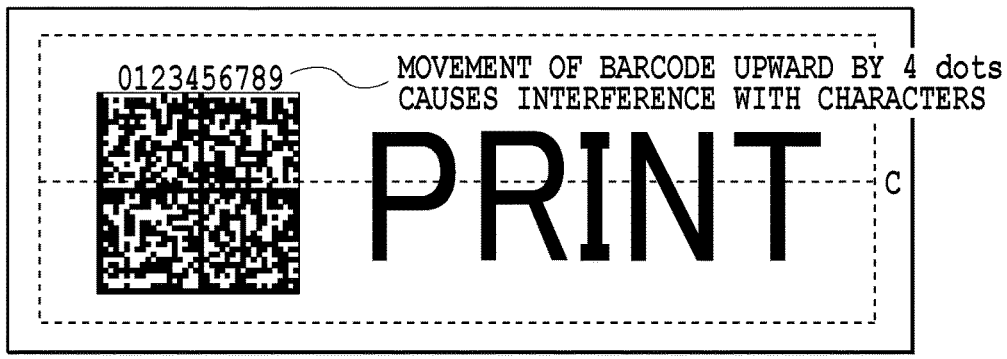
FIG. 15B is a view illustrating the method of image correction.
Figure 15C:
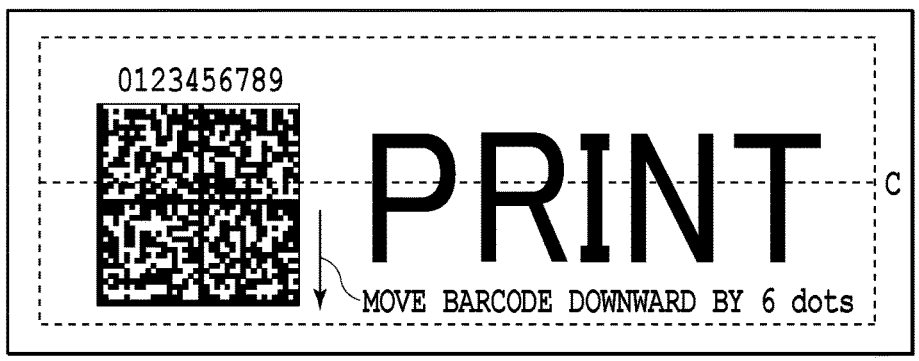
FIG. 15C is a view illustrating the method of image correction.
Figure 16A:
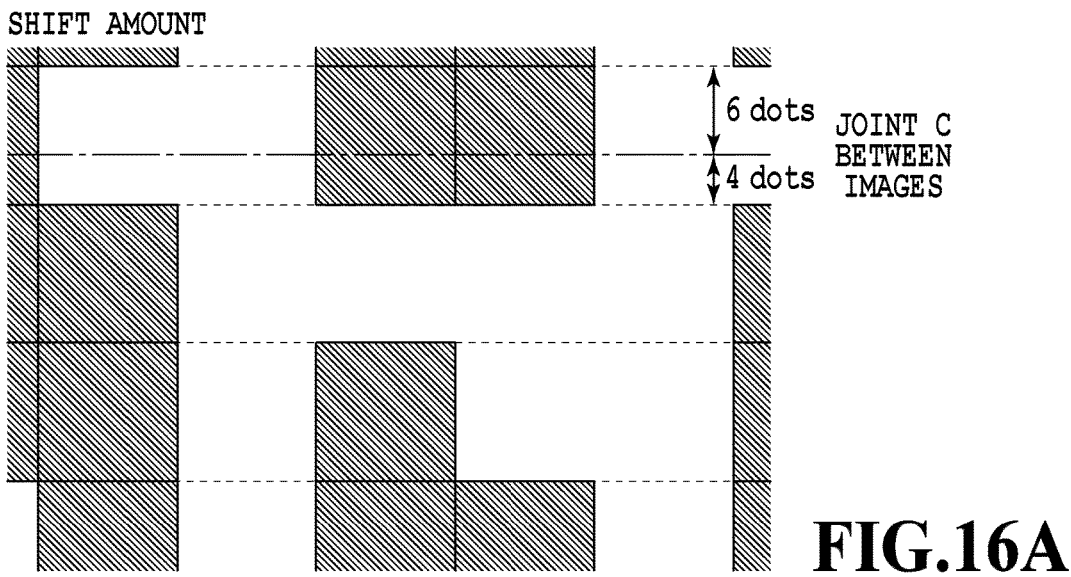
FIG. 16A is a view illustrating a method of image correction.
Figure 16B:
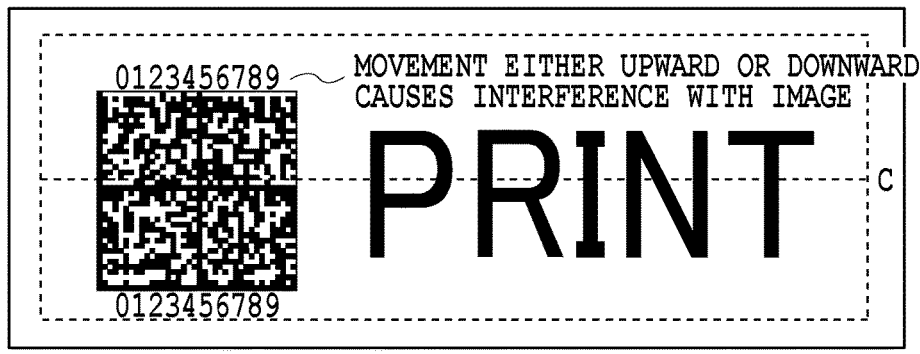
FIG. 16B is a view illustrating the method of image correction.
Figure 16C:
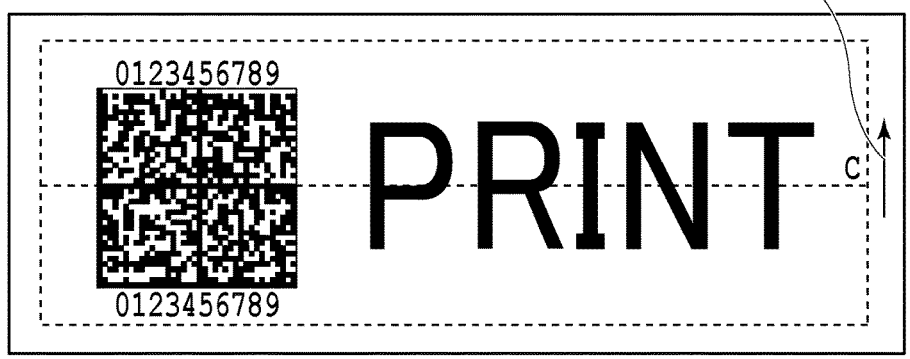
FIG. 16C is a view illustrating the method of image correction.

FIG. 14 is a flowchart illustrating printing control in this embodiment, FIGS. 15A to 15C and FIGS. 16A to 16C are views illustrating a method of image correction in this embodiment. Hereinafter, the printing control of this embodiment will be described by using the flowchart in FIG. 14. Note that, since Step S101 to Step S106 are the same as the first embodiment (Step S1 to Step S6 of the flowchart in FIG. 9), explanation will be omitted.

At Step S105, in a case where CPU determines that the boundary crosses the cell, the process proceeds to Step S107. At Step S107, CPU calculates a moving direction and a movement amount that the end portion of the cell matches the boundary C of the images by the shortest movement (see FIG. 15A), the result is set to a first correction value, and CPU determines whether there is an image element at a destination of movement for the first correction value. In a case where there is no image element at the movement destination, CPU moves the two-dimensional code to the correction value portion previously determined at Step S109, and CPU determines a print image at Step S111. In the case where there is an image element at the movement destination at Step S107 (see FIG. 15B), the process proceeds to Step S108. CPU calculates a movement amount that the end portion of the cell matches the boundary C between the images when moving in the opposite direction, the result is set to a second correction value. CPU determines whether there is an image element at a destination after movement for the second correction value portion.

In the case where there is no image element at the destination of the movement (see FIG. 15C), CPU moves the two-dimensional code to the correction value portion previously determined at Step S109, and CPU determines the print image at Step S111. In the case where there is an image element at the movement destination at Step S108 (see FIG. 16B), the process proceeds to Step S110, CPU moves the entire image for the first correction value portion is performed (see FIG. 16C), and CPU determines the print image at Step S111.

By performing the processing as above, also in a case where there is an image element at the movement destination of the two-dimensional code, the boundary between the image regions does not cross the inside of the cell, and impairment of reading accuracy of the two-dimensional code can be suppressed.

As described above, in printing of the two-dimensional code by a plurality of times of scanning, in the case where the boundary between the image regions crosses the square-shaped minimum information element (cell) of the two-dimensional code, the printing position of the two-dimensional code is corrected so that the boundary between the image regions comes to the end portion of the cell. Alternatively, in the case where there is an image element at the corrected movement destination, movement in the opposite direction is examined, and in the case where there is still an image element at the movement destination of the movement in the opposite direction, the two-dimensional code is moved together with the image element. As a result, the printing apparatus and the printing method which can suppress lowering of the reading accuracy of the two-dimensional code caused by shift of images could be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-174015 filed Sep. 6, 2016, which is hereby incorporated by reference wherein in its entirety.

What is claimed is:

1. A printing apparatus comprising:
 a printing unit performing printing on a printing medium based on image data by scanning a plurality of times on the printing medium;
 a two-dimensional code position determining unit determining positions of a plurality of cells constituting a two-dimensional code based on the image data;
 a boundary position determining unit determining a boundary extending in a scanning direction between a first image forming area formed by a first scan of the printing unit and a second image forming area formed by a second scan different from the first scan and formed at a position different from the first image forming area in a direction orthogonal to the scanning direction, the scanning direction being a scanning direction of the first scan and the second scan; and a control unit configured to move a printing position of the two-dimensional code on the basis of a determination result of the two-dimensional code position determining unit and the boundary position determining unit so that an end portion of a cell formed in the first image forming area and an end portion of a cell formed in the second image forming area match the boundary in a case where the two-dimensional code position determining unit determines that a cell out of the plurality of cells crosses the boundary.

2. The printing apparatus according to claim 1, wherein the control unit moves the printing position of the two-dimensional code so that a movement distance of the two-dimensional code is minimum.

3. The printing apparatus according to claim 2, wherein in a case where there is another image element at a movement destination of the printing position of the two-dimensional code, the control unit moves the printing position of the two-dimensional code in an opposite direction.

4. The printing apparatus according to claim 3, wherein in a case where there is another image element at a movement destination of the printing position of the two-dimensional code, the control unit moves a printing position of an entire image to be printed.

5. The printing apparatus according to claim 1, wherein the printing unit performs printing by ejecting ink from an ejection port of a print head.

6. A printing method comprising:

a printing step of performing printing on a printing medium based on image data by scanning a plurality of times on the printing medium;

a two-dimensional code position determining step of determining positions of a plurality of cells constituting a two-dimensional code based on the image data;

a boundary position determining step of determining a boundary extending in a scanning direction between a first image forming area formed by a first scan of the printing step and a second image forming area formed by a second scan different from the first scan and formed at a position different from the first image forming area in a direction orthogonal to the scanning direction, the scanning direction being a scanning direction of the first scan and the second scan; and a control step of moving a printing position of the two-dimensional code on the basis of a determination result in the two-dimensional code position determining step and the boundary position determining step so that an end portion of a cell formed in the first image forming area and an end portion of a cell formed in the second image forming area match the boundary in a case where it is determined in the two-dimensional code position determining step that a cell out of the plurality of cells crosses the boundary.

* * * * *